UNITED STATES PATENT OFFICE.

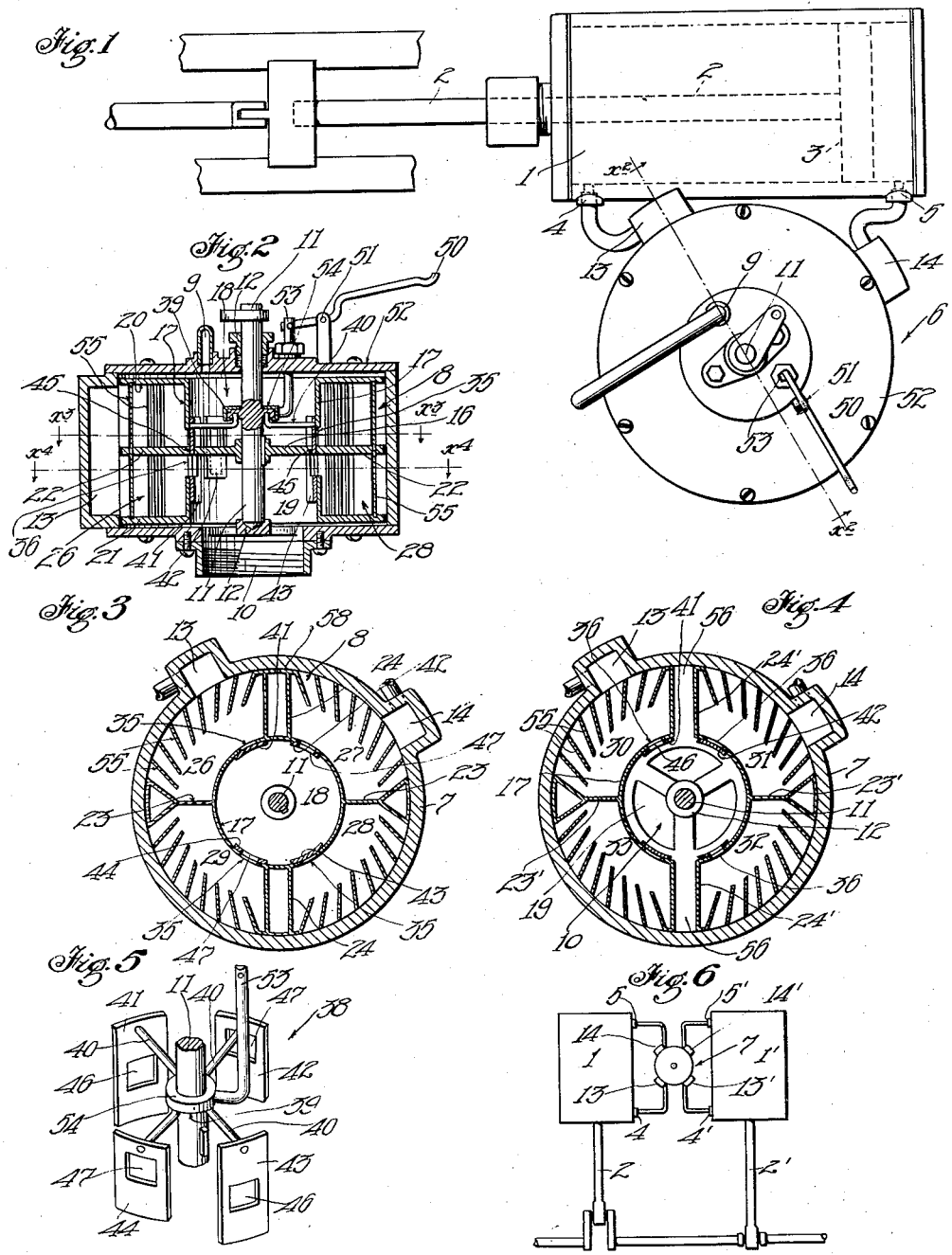

WILLIAM C. SCHAFF AND JACOB A. E. FRIEDERICHS, OF SAN BERNARDINO, CALIFORNIA.

VALVE FOR FLUID-PRESSURE ENGINES.

No. 865,949.  Specification of Letters Patent.  Patented Sept. 10, 1907.

Application filed April 10, 1905. Serial No. 254,736.

*To all whom it may concern:*

Be it known that we, WILLIAM C. SCHAFF, a citizen of the United States, and JACOB A. E. FRIEDERICHS, a subject of the Emperor of Germany, both residing at San Bernardino, in the county of San Bernardino, State of California, have invented a certain new and useful Self-Operating Valve for Fluid-Pressure Engines, of which the following is a specification.

The main object of this invention is to provide a valve which will be self-operating,—that is to say, one that will not depend upon a motive connection with the engine for its operation, but will be operated by the passage of the fluid there-through, the power of the engine being thereby increased by reason of the fact that it does not have to drive the valve.

A further object of the invention is to provide a valve for fluid pressure engines which will be self-operated, and in which the operation will be wholly rotary so as to give a smooth action, and capacity for high speed.

Another object of the invention is to provide a valve of this nature which will be balanced.

Another object of the invention is to provide a valve having the above described characteristics which will be reversible in its operation, and a further object is to provide for adjustment or control of the operation of the valve.

A further object of the invention is to provide an automatic valve that will serve for operating more than one cylinder, particularly when the cylinders have their crank pins operating at different angles, to cause the piston to act alternately.

The accompanying drawings illustrate the invention:

Figure 1 is a plan showing an engine cylinder provided with the self-operating rotary valve. Fig. 2 is a vertical section on the line $X^2$—$X^2$ in Fig. 1. Fig. 3 is a horizontal section on the line $X^3$—$X^3$ in Fig. 2. Fig 4 is a horizontal section on the line $X^4$—$X^4$ in Fig. 2. Fig. 5 is a perspective of the cut-off and reversing device for the valve. Fig. 6 is a diagrammatic view showing the application of the valve to a plurality of alternately-acting cylinders.

1 designates the cylinder of an engine; 2 the piston rod thereof, and 3 the piston, indicated in dotted lines.

4, 5 designate port connections for pipes leading to the respective end portions of the cylinder 1, and 6 designates in a general way the valve which controls admission and exhaust of the fluid pressure medium;
for example, steam, through the passages or connections 4, 5. The valve 6 is a rotary valve and comprises a cylindrical valve chamber or casing 7, and a member 8 fitting and rotating within the chamber 7. The valve chamber or casing 7 is provided with a steam or fluid pressure inlet 9 and with an exhaust outlet 10, the fluid pressure inlet being shown at the top and the exhaust outlet at the bottom of the cylindrical casing.

Member 8 is mounted on a shaft or pivotal support 11, turning in bearings 12 in the top and bottom of the cylindrical casing 7 concentric with said casing.

Recesses 13, 14 are provided in the sides of the cylindrical chamber or casing 7 and communicate respectively with the port connections 4 and 5 leading to the engine cylinder.

Member 8 consists of a cylindrical body having a central web 16 attached to and extending from the shaft 11 to a tubular wall 17 concentric with said shaft. The space within this tubular wall 17 and above the web 16 is open at the top and forms a steam receiving chamber 18, the steam inlet 9 extending through the top of the chamber or casing 7 into communication with the chamber or recess 18.

The chamber or recess 19 within the tubular wall 17 and below the web or partition 16 forms an exhaust chamber, being open at the bottom and communicating with the exhaust opening 10 in the bottom of the casing 7.

Horizontal flanges 20, 21 extend from the top and bottom of the tubular wall 17 to form the upper and lower walls of the valve member 8, and an intermediate flange 22 extends parallel to and between the flanges 20, 21, to form a wall or partition dividing the space within the valve member into upper and lower portions; said space is also divided in a circumferential direction into any desired even number of parts, preferably four, by transversely extending walls 23, 24, for the upper portion of the valve member, and walls 23′, 24′ for the lower portion of the valve member which extend radially from the tubular wall 17 to the outer limit of member 8. The upper part of the space within the valve member is thus divided into four quadrantal chambers, 26, 27, 28 29, and the lower portion of the valve chamber is similarly divided into four quadrantal chambers, 30, 31, 32, 33, these chambers being open at their peripheral portions.

Openings 35 are provided in the tubular wall 17 leading from the steam chamber 18 into the respective chambers 26, 27, 28, 29, at the top of the valve member, and openings 36 are provided in said tubular wall leading from the bottom valve chambers 30, 31, 32, 33, into the exhaust chamber 19.

A slide or closure member 38, (see Fig. 5), is provided wholly or partially to open or close the openings 35, 36, in such manner as to control the speed or power and the direction of movement of the valve and engine. Said member 38 comprises a ring 39 to which are attached four radial arms 40 carrying respectively valve plates 41, 42, 43, 44, the outer faces of which fit against and within the inner wall or inner face of tubular wall 17. Said valve plates slide or fit in slots 45 in the transverse horizontal wall or partition 16, so that each of said valve plates coöperates with openings 35, 36, in the upper and lower valve chambers in the corresponding quadrant. Said valve plates are provided with ports or openings, the openings 46 in the opposite valve plate 41, 43, being at a lower level than the openings 47 in the alternate valve plates 42, 44.

Suitable means are provided for raising and lowering the member 38, said means consisting, for example, of a lever 50 pivoted at 51 to the top 52 of valve casing 7, and pivotally connected to a slide pin 53 extending through said top into the steam chamber 18 and carrying at its inner end a ring or collar 54 engaging with the ring 39 to raise and lower the same as the lever 50 is operated. Said lever may be provided with or connected to any suitable controlling means for manual, or other control, as will be understood. Valve member 8 is also provided with deflecting means arranged in each of the valve chambers 26, 27, etc. and 30, 31, etc. to be acted upon by the steam in passing through said chamber, so as to cause rotation of said valve member, the latter operating as a turbine. Said deflecting means consists of plates or blades 55 set at an angle to the radial direction in each chamber and extending between the respective flanges 22, 21, adjacent to the peripheral portions thereof. These deflecting blades are directed reversely in alternate chambers 26, 27, etc. and 30, 31, etc. so as to provide for reversal as hereinbefore described.

An additional exhaust connection is provided from the lower exhaust chamber to the periphery of member 8 consisting of passages 56 extending through the walls 24' aforesaid from the exhaust chamber 19 to the outside of member 8 so as to establish direct communication from the cylinder passages 4, 5, and recesses 13, 14, to the exhaust outlet 10, at certain times in the rotation of the valve.

The operation is as follows:— The steam being turned on through the steam supply pipe or inlet 9, enters the steam chamber 18. If the controlling device is in the intermediate position, all the openings 35 will be closed with the result that the steam will not pass to either end of the cylinder. If it is desired to start the engine in one direction, the said controlling device is moved to open certain of the openings 35,—being, for example, raised so as to open connection through the openings 46 in plates 42 and 44, and the opening 35 to chambers 27 and 29, as shown in Fig. 3. This same movement establishes communication through openings 46 in valve plates 41, 43, and openings 36 in tubular wall 17, from the lower chambers 30, 32 to the exhaust. Steam will now pass from the chamber 18 to chamber 27, thence passing the deflectors 55 in said chamber to recess 14, and through port connection 5 to one end of the cylinder, bringing pressure on the piston and starting the engine in operation. The steam or fluid on the other side of the piston at the same time escapes through the recess 13 into the chamber 30, (see Fig. 4), and thence through openings 35, 46, into the exhaust chamber 19 and passes out at the exhaust outlet 10. As valve member 8 is appropriately turned, manually or otherwise, the connections are reversed, the chamber 27, which is filled with steam under pressure, being brought into communication with the recess 13 and port connections 4, and the recess 30, which is connected to exhaust, being brought in connection with recess 14 and port connections 5. This reversal takes place at the moment the engine passes the dead point. In the next quarter turn the pressure chamber 28 and exhaust chamber 32 come respectively opposite the openings 13 and 14, to again reverse the operation on the piston, and so on. A certain amount of "dead" wall 58 may be provided on the valve member 8, to cut off the steam before the engine reaches the dead point, to give a certain amount of expansion, and just at the dead point the passages 56 open the cylinder to exhaust, to release any pressure that may exist and prevent cushioning. When it is desired to reverse the engine, the member 38 is lowered, thereby reversing the pressure and exhaust connections to the chamber 26, 27, etc. and 30, 31 etc.

In applying the valve to a plurality of engines, as shown in Fig. 6, it is only necessary to provide a recess 13, 13' and a recess 14, 14' corresponding to the respective cylinders and connected thereto by port connections 4, 4' and 5, 5', the recesses 13, 13', 14, 14' being arranged in succession around the valve casing 7, in different angular positions to establish connections for the pressure and exhaust sides of the valve alternately to the two ends of each cylinder 1, and 1' and the connections to cylinder 1', alternating with the connections to cylinder 1, so that the cylinders will operate alternately. There being four steam chambers 26, 27, etc. in the valve member 8, and the opposite steam chambers, for example, 26, 28, being similarly controlled, it follows that the pressures in the valve are balanced in such manner that there is no side pressure thereof, so that friction and wear on the valve and its bearings are reduced to a minimum.

It is to be understood that the several piston rods 2, 2' may be variously connected to an operable member as a shaft, and that the means for timing the action of the valve may be of various constructions and variously connected within the knowledge of those versed in the art without the necessity of illustrating the same.

What we claim is:

1. The combination with an engine cylinder, of a valve therefor comprising a valve cylinder having port connections to opposite ends of the cylinder, a valve member rotatably mounted within said cylinder and having steam and exhaust chambers and provided with port chambers communicating, in the rotation of the valve, alternately with the cylinder port connections aforesaid, and valve means controlling communication between said port chambers and the steam and exhaust chambers of the valve.

2. The combination with an engine cylinder, of a valve therefor comprising a valve cylinder having port connections to opposite ends of the cylinder, a valve member rotatably mounted within said cylinder and having steam and exhaust chambers, and provided with port chambers communicating, in the rotation of the valve, alternately with the cylinder port connections aforesaid, and valve means controlling communication between said port chambers and the steam and exhaust chambers of the valve, said valve means comprising parts reversing communication from the steam and exhaust chambers to the respective port chambers.

3. The combination with an engine cylinder, of a valve therefor comprising a valve cylinder having port connections to opposite ends of the cylinder, a valve member rotatably mounted within said cylinder and having steam and exhaust chambers, and provided with port chambers communicating, in the rotation of the valve, alternately with the cylinder port connections aforesaid, and valve means controlling communication between said port chambers and the steam and exhaust chambers of the valve, said valve means comprising parts reversing communication from the steam and exhaust chambers to the respective port chambers, and the rotatable valve member being provided with oppositely directed deflecting means in the respective port chambers for causing reverse rotation of said member under said reverse connections.

4. The combination with a plurality of alternately acting engine cylinders, of a valve cylinder having a plurality of angularly disposed sets of ports leading to the ends of the respective cylinders, a rotatable valve member within the valve cylinder, having a plurality of circumferentially disposed port chambers communicating with the aforesaid port connections in the rotation of said member, and pressure supply and exhaust connections to said rotatable valve member.

In testimony whereof, we have hereunto set our hands at San Bernardino California this first day of April 1905.

WILLIAM C. SCHAFF.
JACOB A. E. FRIEDERICHS.

In presence of—
J. W. STEPHENSON,
D. S. PRATT.